(12) United States Patent
Kim et al.

(10) Patent No.: US 10,464,520 B2
(45) Date of Patent: Nov. 5, 2019

(54) FOLDING MACHINE FOR SIDE CURTAIN AIRBAG AND PROCESS FOR FOLDING SIDE CURTAIN AIRBAG USING THE SAME

(71) Applicant: KOLON INDUSTRIES, INC., Gwacheon-si, Gyeonggi-do (KR)

(72) Inventors: Ki-Jeong Kim, Yongin-si (KR); Sang Mok Lee, Yongin-si (KR); Jung-Hoon Youn, Yongin-si (KR); Dong-Jin Kwak, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 593 days.

(21) Appl. No.: 15/025,617

(22) PCT Filed: Sep. 30, 2014

(86) PCT No.: PCT/KR2014/009199
§ 371 (c)(1),
(2) Date: Mar. 29, 2016

(87) PCT Pub. No.: WO2015/047027
PCT Pub. Date: Apr. 2, 2015

(65) Prior Publication Data
US 2016/0236643 A1    Aug. 18, 2016

(30) Foreign Application Priority Data

Sep. 30, 2013  (KR) .................. 10-2013-0116674

(51) Int. Cl.
*B60R 21/23*    (2006.01)
*B60R 21/232*   (2011.01)
*B60R 21/237*   (2006.01)

(52) U.S. Cl.
CPC .... *B60R 21/237* (2013.01); *B60R 2021/2375* (2013.01)

(58) Field of Classification Search
CPC ................ B60R 21/232; B60R 21/237; B60R 2021/2375; B65B 63/02; B65B 63/04; Y10S 493/94
See application file for complete search history.

(56) References Cited

U.S. PATENT DOCUMENTS 3,839,947 A  * 10/1974  Kornas ................. B60R 21/237
                                                        493/244
3,839,948 A  * 10/1974  Putti ..................... B60R 21/237
                                                        493/244

(Continued)

FOREIGN PATENT DOCUMENTS

| JP | 02-291363 A | 12/1990 |
|----|-------------|---------|
| JP | 2006-205942 A | 8/2006 |
| JP | 2011-246078 A | 12/2011 |

OTHER PUBLICATIONS

International Searching Authority, International Search Report for PCT/KR2014/009199 dated Jan. 9, 2015 [PCT/ISA/210].

(Continued)

*Primary Examiner* — Andrew M Tecco
*Assistant Examiner* — Eyamindae C Jallow
(74) *Attorney, Agent, or Firm* — Sughrue Mion, PLLC

(57) ABSTRACT

A machine for folding a side curtain airbag which has a simpler machine configuration and is more efficient than a fully automatic machine and that can fold a large-capacity side curtain airbag cushion of approximately 4.0 m in length to sufficiently secure quality stability, and a process for folding a side curtain airbag by using the same, are provided.

8 Claims, 3 Drawing Sheets

(56) References Cited

U.S. PATENT DOCUMENTS

| | | | | |
|---|---|---|---|---|
| 4,286,954 | A * | 9/1981 | McArthur | B60R 21/237 280/743.1 |
| 5,163,893 | A * | 11/1992 | Hara | B60R 21/237 280/743.1 |
| 5,300,011 | A | 4/1994 | Budde et al. | |
| 5,391,137 | A * | 2/1995 | DePoy | B60R 21/237 493/405 |
| 5,456,651 | A * | 10/1995 | Baker | B60R 21/237 493/243 |
| 5,493,846 | A | 2/1996 | Baker et al. | |
| 6,656,104 | B1 | 12/2003 | Forrester et al. | |
| 6,718,725 | B2 * | 4/2004 | Farwig | B60R 21/237 493/440 |
| 7,261,682 | B2 * | 8/2007 | Crookston | B60R 21/232 280/743.1 |
| 2003/0114287 | A1 * | 6/2003 | Florsheimer | B60R 21/237 493/457 |
| 2004/0065766 | A1 | 4/2004 | Dato et al. | |
| 2006/0138749 | A1 * | 6/2006 | Nakamura | B60R 21/237 280/728.2 |
| 2007/0063094 | A1 | 3/2007 | Dato et al. | |
| 2011/0291393 | A1 * | 12/2011 | Nakamura | B60R 21/213 280/730.2 |
| 2013/0062869 | A1 | 3/2013 | Ostman | |

OTHER PUBLICATIONS

International Searching Authority,Written Opinion for PCT/KR2014/009199 dated Jan. 9, 2015 [PCT/ISA/237].

* cited by examiner

FOLDING MACHINE FOR SIDE CURTAIN AIRBAG AND PROCESS FOR FOLDING SIDE CURTAIN AIRBAG USING THE SAME

CROSS REFERENCE TO RELATED APPLICATIONS

This application is a National Stage of International Application No. PCT/KR2014/009199, filed on Sep. 30, 2014, which claims priority from Korean Patent Application No. 10-2013-0116674, filed on Sep. 30, 2013, the contents of all of which are incorporated herein by reference in their entirety.

TECHNICAL FIELD

The present invention relates to a machine which can effectively fold a side curtain airbag for preventing a passenger from suffering injuries due to a side window or structure of a vehicle when the vehicle turns over, and a process for folding the side curtain airbag using the same.

BACKGROUND OF THE INVENTION

In general, an airbag is a device that senses a collision impact applied to a vehicle through an impact sensor and then supplies a gas into an airbag cushion and expands the airbag cushion by detonating gunpowder when a vehicle being driven suffers a head-on or broadside collision at a speed of approximately 40 km/h or higher to protect a driver and a passenger.

In recent years, as interest in safety of passengers in addition to functionality and convenience of the vehicle have increased, there has been a gradually increasing trend in the importance of devices associated with safety which can safely protect passengers when an accident of a vehicle occurs. Among the safety devices, in particular, an airbag system is used together with a safety belt to serve to prevent the passenger from suffering injuries when a head-on collision or a broadside collision of the vehicle occurs. In the airbag system, in particular, an airbag system associated with the broadside collision of the vehicle is generally used separately as a curtain airbag for protecting a head part and a side airbag for protecting the side of the passenger. Herein, the curtain airbag generally has a structure in which the curtain airbag is installed along a lateral top of a vehicle interior and is extended as a curtain type when a collision of the vehicle occurs, and the side airbag is mounted on a door or the side of a seat to prevent the passenger from suffering injuries as the side of the passenger directly hits a vehicle body including the door.

In particular, the side curtain type of airbag is an airbag installed on a side window or side structure of the vehicle in order to prevent the passenger from hitting the side window or structure of the vehicle when the vehicle turns over. In the case of the side curtain type airbag, a separate device is required to fold a side curtain airbag cushion having approximately 2 m of material as the length of the vehicle body increases.

Most side curtain airbags have a complicated configuration for roll folding thereof and use a high-priced fully automatic machine. However, the fully automatic machine has a problem in that the machine itself is very expensive, a machine configuration is very complicated, a volume thereof is very large, and maintenance cost for the machine is significantly large. Alternatively, in a manual folding machine which is primarily adopted in low-wage countries, only cushion folding of approximately 2 m is enabled, and as a result, it is difficult to secure stability for a folding size and folding quality.

Therefore, research into development of a side curtain airbag folding machine that has a simpler machine configuration and is more efficient than the fully automatic machine and that can fold a large-capacity side curtain airbag cushion of approximately 4.0 m to sufficiently secure quality stability is required.

The above information disclosed in this Background section is only for enhancement of understanding of the background of the invention and therefore it may contain information that does not form the prior art that is already known in this country to a person of ordinary skill in the art.

DETAILS OF THE INVENTION

Objects of the Invention

The present invention has been made in an effort to provide a machine which can effectively fold a large-capacity side curtain airbag for preventing a passenger from suffering injuries due to a side window or structure of a vehicle when the vehicle turns over, and a folding process using the same.

Means for Achieving the Object

An exemplary embodiment of the present invention provides a machine for folding a side curtain airbag, including a fixed rotatable roll folding bar with left and right manual handles.

Another exemplary embodiment of the present invention provides a machine for folding a side curtain airbag, including: a fixed rotatable roll folding bar with left and right manual handles; a mechanical tension module applying a load to one end of an airbag cushion; and an upper support fixture fixing the position of the airbag cushion in roll folding.

The machine for folding a side curtain airbag may include at least two roll folding bars.

The thickness of the roll folding bar may be 1.0 to 3.0 mm.

The mechanical tension module may apply a load of 1 to 5 kg to one end of an airbag cushion. The mechanical tension module may apply the load to the top of the airbag cushion.

The upper support fixture may include air-cylinder or manual clamp modules disposed on the top of the roll folding bar with the same length as a whole cushion length or disposed at three or more locations.

The machine for folding a side curtain airbag may further include a tension unit capable of controlling horizontal edge tension of the airbag cushion.

The machine for folding a side curtain airbag may further include an air-cylinder clamp module for supporting one end of the airbag cushion.

The machine for folding a side curtain airbag may further include an L-shaped folding plate fixing one end of the airbag cushion.

The machine for folding a side curtain airbag may further include a guide rail moving the L-shaped folding plate to the bottom thereof.

The machine for folding a side curtain airbag may further include a handle support fixture supporting a rotating body of the fixed rotatable roll folding bar to not touch the bottom thereof.

The machine for folding a side curtain airbag may further include a roll-folded cushion fixing lower support bar disposed on the bottom of the fixed rotatable roll folding bar.

Yet another exemplary embodiment of the present invention provides a machine for folding a side curtain airbag, including: an L-shaped folding plate fixing one end of an airbag cushion; a guide rail moving the L-shaped folding plate to the bottom thereof; an air-cylinder or manual clamp module for supporting one end of the airbag cushion; a mechanical tension module applying a load to one end of the airbag cushion; a fixed rotatable roll folding bar with left and right manual handles; a handle support fixture supporting a rotating body of the fixed rotatable roll folding bar to not touch the bottom thereof; a roll-folded cushion fixing lower support bar disposed on the bottom of the fixed rotatable roll folding bar; and an upper support fixture fixing the position of the airbag cushion in roll folding.

Still yet another exemplary embodiment of the present invention provides a process for folding a side curtain airbag, including applying a load to one end of an airbag cushion after fixing the bottom of the airbag cushion to a fixed rotatable roll folding bar with left and right manual handles and performing roll folding by fixing the position of the airbag cushion by using an upper support fixture.

A load of 1 kg to 5 kg may be applied to the airbag cushion.

Effects of the Invention

According to exemplary embodiments of the present invention, a roll folding bar with left and right manual handles is provided, and as a result, a machine configuration is simpler and it is more efficient and cost of the machine itself and maintenance are smaller than a fully automatic machine in the related art.

Further, a machine for folding a side curtain airbag occupies a small volume and is simple in machine operation to improve process efficiency.

DETAILED DESCRIPTION OF THE EMBODIMENT

Figure 1:
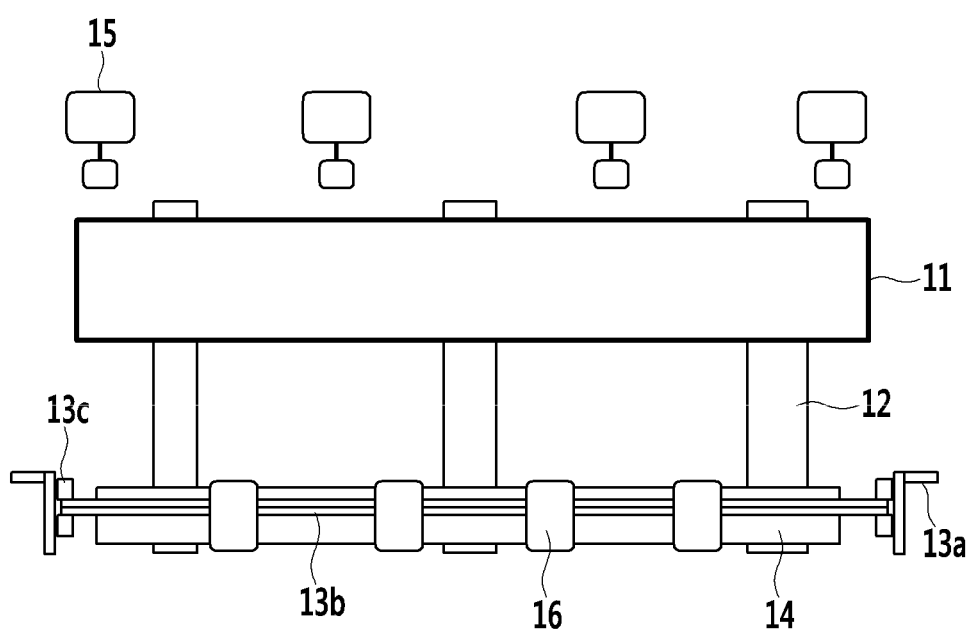
FIG. 1 is a schematic view illustrating a machine for folding a side curtain airbag according to an implementation example of the present invention in a plane shape observed from the top.

Hereinafter, a machine for folding a side curtain airbag according to a detailed implementation example of the present invention and a process for folding a side curtain airbag by using it will be described in more detail. However, this is presented as one example of the present invention and the scope of the present invention is not limited thereto, and it is apparent to those skilled in the art that various transformations of the implementation example can be made within the scope of the present invention.

Additionally, unless particularly mentioned throughout the specification, "including" or "containing" designates including any component (alternatively, constituent element) without a particular limit, and may not be analyzed as addition of another component (alternatively, constituent element) being excluded.

As an experimental result of the present inventors, it is revealed that a roll folding bar with left and right manual handles is provided to effectively fold a large-capacity side curtain airbag in manufacturing a cushion module before being mounted on a vehicle.

Therefore, according to one implementation example of the present invention, the present invention provides a machine for folding a side curtain airbag including a fixed rotatable roll folding bar with left and right manual handles. In particular, the machine for folding a side curtain airbag may include: a fixed rotatable roll folding bar with left and right manual handles; a mechanical tension module applying a load to one end of an airbag cushion; and an upper support fixture fixing the position of the airbag cushion in roll folding.

The folding machine according to the present invention is a manual side curtain airbag roll folding machine and a machine that may uniformly and effectively fold a long airbag cushion of, particularly, 2.5 m or more or 2.5 m to 6 m, preferably 2.8 m or more, and more preferably 3.0 m or more. The conventional manual machine is primary adopted in low-wage countries and may fold only cushions of approximately 2.0 m. The conventional manual folding machine has a mechanism described below. The bottom of the cushion is fixed to a folding bar, and is then laid on the bottom of a table and roll folding is slowly performed while forwarding the cushion upward. In this case, folded power may be constantly transferred to the cushion of approximately 2.0 m. However, in the case of the conventional manual folding machine, the power is not uniformly and constantly transferred in the long cushions of 2.0 m or more, 3.0 m or more, or 3.5 m or more, and as a result, a cone shape error in which one side is excessively tilted after folding occurs.

On the contrary, the machine for folding the side curtain airbag according to the present invention may effectively perform uniform roll folding with respect to the long cushions. In particular, the folding machine of the present invention may be more universally operated and secure stability of folding quality. Unlike the conventional manual folding machine, a rotating body rotates while being fixed to a regular position. For example, power is applied to a fixed rotating device while a predetermined load is applied to the top of the cushion after fixing the bottom of the cushion to the folding bar, and as a result, folding in which the top of the cushion is slowly rolled is performed.

In particular, the machine for folding the side curtain airbag according to the present invention prevents the cushion from being easily shaken or separated through various clamping devices, for example, a manual lever type of fixing device, a pneumatic cylinder, and a plate, and is wound while applying a predetermined load to the fixed rotating body to achieve uniform roll folding.

Hereinafter, a machine for folding a side curtain airbag of the present invention will be described more fully with reference to the accompanying drawings, so that those skilled in the art may easily implement the same.

Figure 2:
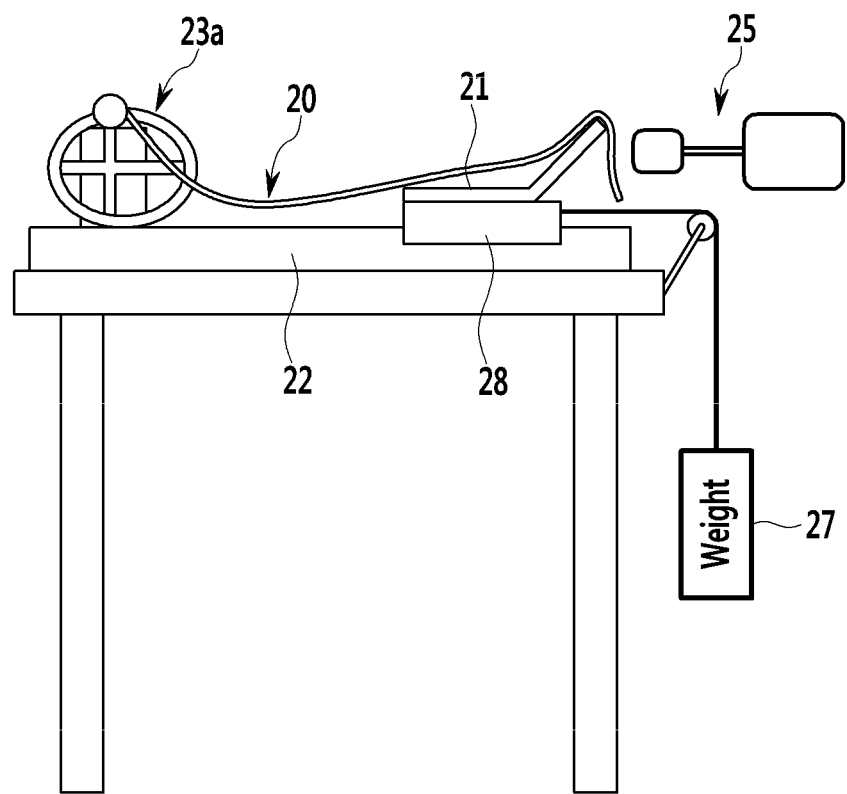
FIG. 2 is a schematic view illustrating a side view of the machine for folding a side curtain airbag according to an implementation example of the present invention.
Figure 3:
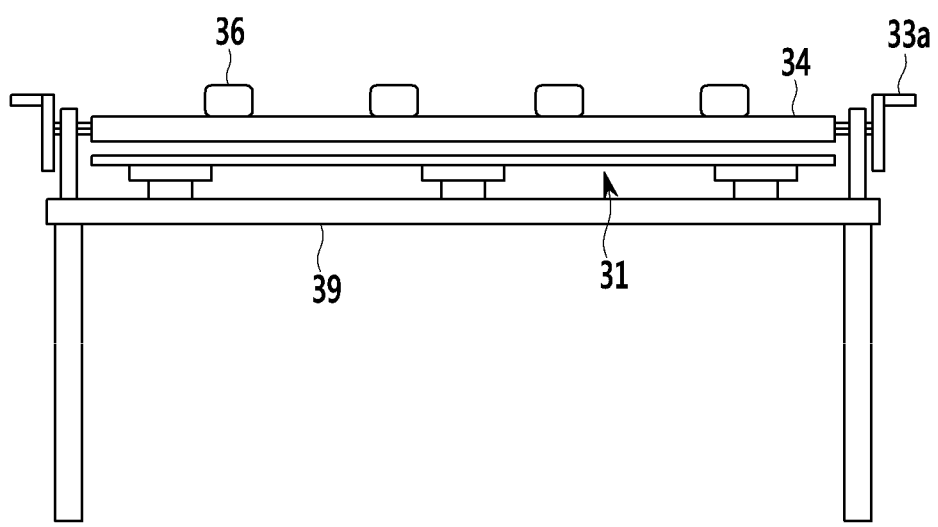
FIG. 3 is a schematic view illustrating a rear view of the machine for folding a side curtain airbag according to an implementation example of the present invention.

FIG. 1 is a schematic view illustrating a machine for folding a side curtain airbag according to an implementation example of the present invention in a plane shape observed from the top. FIG. 2 is a schematic view illustrating a side shape of the machine for folding a side curtain airbag. FIG. 3 is a schematic view illustrating a shape of the machine for folding a side curtain airbag viewed from the bottom.

As illustrated in FIG. 1, the machine for folding a side curtain airbag according to the preset invention may include an L-shaped folding plate 11 stably holding and fixing the top of an airbag cushion, a guide rail 12 assisting the L-shaped folding plate to naturally move to the bottom when the L-shape folding plate is wound, a folding handle 13a for transferring power in cushion folding, a lower support bar 14 constantly holding a roll-folded cushion, an air-cylinder clamp 15 fixing a cushion top to not separate, a folding bar 13b fixing a cushion bottom, a handle support fixture 13c supporting a fixed rotating body to not touch the bottom, and an upper support fixture 16 holding a folding assembly to not be separated from the top in roll folding.

In FIG. 1, the side curtain airbag cushion bottom is mounted on two folding bars 13b. In this case, the cushion top is mounted on the folding plate 11 and thereafter fixed to the air-cylinder clamp 15. While the cushion is fully unfolded, each of the bottom and the top is fixed, and in this state, the horizontal folding handle 13a is turned to wind the cushion. In this case, the folding plate is wound while sliding slowly on the guide rail 12 while the cushion top is fixed.

Further, as illustrated in the side view of FIG. 2, the machine for folding a side curtain airbag according to the present invention may include an L-shaped folding plate 21 stably holding and fixing the top of an airbag cushion 20, a folding handle 23a for transferring power while folding the airbag cushion, an air-cylinder clamp 25 fixing the cushion top to not be separated, a mechanical tensioner (alternatively, mechanical tension module) 27 for applying a predetermined load while folding the cushion, a guide rail 22 assisting the L-shaped folding plate 21 to naturally move to the bottom when the L-shaped folding plate 21 is wound, and a moving rail 28 assisting the L-shaped folding plate 21 to easily move through the guide rail 22.

As illustrated in the rear view of FIG. 3, the machine for folding a side curtain airbag according to the present invention may include a folding handle 33a for transferring power at the time of folding the airbag cushion, an L-shaped folding plate 31 stably holding and fixing the top of the airbag cushion, an upper support fixture 36 holding a folding assembly to not be easily separated from the top in roll folding, a lower support bar 34 constantly holding the roll folded cushion, and a folding table 39.

In the machine for folding a side curtain airbag according to the present invention, the roll folding bar may be made of steel and the steel thickness of the roll folding bar may be approximately 1.0 to 3.0 mm, preferably 1.0 to 2.0 mm, and more preferably 1.0 to 1.5 mm. In particular, when the thickness of the folding bar is too small, a problem may occur in durability, and as a result, the steel thickness of the roll folding bar may be 1.0 mm or more in terms of the durability of the machine. On the contrary, when the steel thickness is too large, flexibility deteriorates, and as a result, folding workability deteriorates and after folding is completed, when the cushion is drawn out from the folding bar, it may be difficult to easily draw out the cushion due to the steel thickness of the folding bar. Therefore, the steel thickness of the roll folding bar may be 3.0 mm or less in order to improve the folding workability.

In the machine for folding a side curtain airbag according to the present invention, since two roll folding bars operate as one set, the roll folding bar may be constituted by two or more thereof. In particular, the folding bar may include two thereof in order to support the cushion bottom.

A folding direction of the machine for folding a side curtain airbag may be a horizontal or vertical direction.

Further, in the machine for folding a side curtain airbag according to the present invention, the mechanical tension module that applies the load to one end of the airbag cushion applies a physical load as a simple load by using ballast, and may apply a load of 1 kg to 5 kg to the airbag cushion. The mechanical tension module may apply the load particularly to the top of the airbag cushion.

In the machine for folding a side curtain airbag, the upper support fixture may include air-cylinder or manual clamp modules disposed on the top of the roll folding bar with the same length as a whole cushion length, or may be disposed at three or more locations.

The machine for folding a side curtain airbag according to the present invention may also include a separate clamp module for fixing one end of the cushion. The clamp module may be an air-cylinder clamp or a clip-type manual clamp. For example, a one-end support jig may be a clip-type manual clamping or air cylinder clamping type. A pneumatic machine (air cylinder clamping) using air pressure as a device that fixes one end of the cushion to the L-shaped folding plate may be used. However, a general manual clamp may be used instead of the air-cylinder type. While folding the cushion, in order to prevent the cushion from being separated from the L-shaped folding plate, stable clamping is required, and when the machine using the air pressure is used, a more stable process may be secured.

The machine for folding a side curtain airbag may include a tension unit that may control horizontal edge tension of the airbag cushion. While performing the folding, a horizontal edge of the cushion may decrease or be rolled by roll-folded tension. In this case, a finally completed roll-folding shape may not be constant and a cone shape phenomenon in which one edge is excessively tilted easily occurs. In order to prevent the cone shape phenomenon, one folding unit device is designed to move horizontally by approximately 30 cm to fix the cushion bottom, and then apply sufficient tension to the horizontal edge. The tension unit as a device component for applying the tension in order to pull the horizontal edge of the cushion bottom into a tight state may add the tension to the folding bar itself while the cushion bottom is held on the folding bar. In particular, one tension unit fixing device is designed to move horizontally to add the tension to the folding bar. For example, the tension bar has a form in which the tension bar is slightly bent in a natural state during non-operation and a degree to maintain an iron plate in the tight state by pulling the tension bar to one side is controlled to control the horizontal edge tension of the airbag cushion.

Further, the machine for folding a side curtain airbag may include an upper support fixture for fixing the location at the time of roll-folding the airbag cushion. The upper support bar may attach a separate support jig to three or four positions on a lower support bar or as a full width type in order to prevent the folding unit from being separated from the upper part during the cushion folding process. In this case, both a pneumatic scheme and a manual scheme may be applied as a supporting scheme. Herein, the full width bar type is a scheme that covers one end of the whole cushion, for example, the top, and when a separate configuration module is used, three or more positions are preferably applied. When fewer than three positions are applied, since it is difficult to support the folding unit at a specific portion, so three or more positions are preferably applied.

The machine for folding a side curtain airbag may include a lower support bar so as to move vertically in order to easily remove the cushion after completing the folding. The lower support bar is a device that supports the cushion bottom, so it is necessary to draw out the cushion folding assembly from the folding bar after the cushion folding is completed, and in this case, the cushion folding assembly may move to the bottom so that an operator can easily draw out the folding assembly.

The machine for folding a side curtain airbag according to the present invention may also include a support plate that can fix one end of the cushion in the roll folding and naturally move while holding predetermined tension.

The machine for folding a side curtain airbag may also include a mechanical tensioner and a guide rail for movement.

Meanwhile, the airbag cushion may be easily folded in a winding scheme only when a specific load is applied, while one end, for example, the top, is wound to the other end, for example, the bottom. A method that applies the load may include various methods, but in the present invention, a particularly managed load may be 1 kg to 5 kg. Herein, when the load is less than 1 kg, it is difficult to apply the load to the winding folding, and as a result, uniform folding may be difficult. Further, when the load is more than 5 kg, folding is impossible because of an excessive load or a quality problem may occur due to cushion damage in folding. The machine for folding a side curtain airbag according to the present invention may be operated by preferably applying a load of 1 to 3 kg, and more preferably a load of 1 to 2 kg. In particular, in folding, the airbag is rolled from the bottom of the cushion and folded, and before the folding starts, the airbag is folded while a predetermined load is applied to one end of the cushion, for example, the top of the cushion, and as a result, the airbag may be folded more tightly and densely. That is, while the tension is applied constantly by applying the load to one end, the airbag may be folded with a smaller roll diameter and be more compact after folding by rolling the airbag from the bottom.

The machine for folding a side curtain airbag according to the present invention may include: an L-shaped folding plate fixing one end of an airbag cushion; a guide rail moving the L-shaped folding plate to the bottom; an air-cylinder or manual clamp module for supporting one end of the airbag cushion; a mechanical tension module applying a load to one end of the airbag cushion; a fixed rotatable roll folding bar with left and right manual handles; a handle support fixture supporting a rotating body to not touch the bottom on the fixed rotatable roll folding bar; a roll-folded cushion fixing lower support bar disposed on the bottom of the fixed rotatable roll folding bar; and an upper support fixture for fixing the airbag cushion in roll folding.

According another implementation example of the present invention, a process for effectively folding a large-capacity side curtain airbag by using the machine is provided. The process for folding the side curtain airbag includes applying a load to one end of the airbag cushion after fixing the bottom of the airbag cushion to the fixed rotatable roll folding bar with the left and right manual handles, and performing roll folding by fixing the position of the airbag cushion by using the upper support fixture.

In the process for folding the side curtain airbag, the load of 1 kg to 5 kg may be applied to the airbag cushion.

Hereinafter, preferred examples are presented in order to help appreciation of the present invention, but the following examples just illustrate the present invention and the scope of the present invention is not limited to the following examples.

EXAMPLE 1

As illustrated in FIGS. 1 and 2, the machine for folding the side curtain airbag was manufactured to include all of the L-shaped folding plate 11, the lower support bar 14, the fixed rotatable roll folding bars 13a and 13b with the left and right manual handles, the mechanical tension module 27, and the upper support fixture 16. Herein, for cushion top clamping, cushion top clamping to which a pneumatic machine is applied is used and power required for folding was performed through a manual handle. Further, the fixed rotatable roll folding bar with the left and right manual handles is made of a steel material having a predetermined thickness, two fixed rotatable roll folding bars constitute one set, and the fixed rotatable roll folding bar was mounted while being configured as a module that may arbitrarily impart the tension horizontally so as to maintain the bottom edge in a tight state. Further, the mechanical tension module that applies the load to the top of the airbag cushion is directly connected to the L-shaped folding plate to be mounted so as to apply a simple physical load by using ballast having a specific weight. In addition, the upper support fixture or upper support jig for fixing the position of the airbag cushion in roll folding was mounted while including the air cylinder and the support plate to be tightly fixed by the pneumatic device. In this case, the upper support fixtures were disposed for each section at four positions (4-pos') at a predetermined interval in a cushion length direction.

In the case of the side curtain airbag cushion of the airbag to be used for a folding test, a cut-and-sew type of side curtain airbag having a total cushion length of 3.2 m was used as the folding test cushion.

EXAMPLE 2

Except for applying motor power instead of manual power, the machine for folding the side curtain airbag was manufactured by the same method as Example 1.

EXAMPLE 3

Except for applying a manual clamp instead of the pneumatic clamp as the top clamping scheme, the machine for folding the side curtain airbag was manufactured by the same method as Example 1.

COMPARATIVE EXAMPLE 1

A conventional manual folding machine not adopting a fixed winding rotation but having a forward scheme was used.

The conventional manual folding machine is constituted by only a folding bar, a handle, and a guide, and has a simple form in which the operator performs folding by rotating the folding bar while holding the cushion on the folding bar.

COMPARATIVE EXAMPLE 2

Except for having no upper support fixture, the machine for folding the side curtain airbag was manufactured by the same method as Example 1.

COMPARATIVE EXAMPLE 3

Except for not applying the mechanical tension module, the machine for folding the side curtain airbag was manufactured by the same method as Example 1.

EXPERIMENTAL EXAMPLE

Performance evaluation for the folding machine according to Examples 1 to 3 and Comparative Examples 1 to 3 is measured by the following method, and measurement results are shown in Table 1 given below.

1) Cushion folding cone shape evaluation: A titling degree of one edge after folding is measured. In this case, a criterion for pass/failure judgment is selected as approximately 10 cm.

2) Cushion folding diameter evaluation: A roll diameter of the folding assembly was measured by using a pair of vernier calipers. In this case, the criterion for the pass/failure judgment was based on a roll diameter of a maximum of 36 mm.

TABLE 1

|  | Example 1 | Example 2 | Example 3 | Comparative Example 1 | Comparative Example 2 | Comparative Example 3 |
|---|---|---|---|---|---|---|
| Folding cushion length (m) | 3.2 | 3.2 | 3.2 | 3.2 | 3.2 | 3.2 |
| Folding scheme | Fixed | Fixed | Fixed | Movable | Fixed | Fixed |
| Power application scheme | Manual | Motor | Manual | Manual | Manual | Manual |
| Clamping | Pneumatic | Pneumatic | Manual | — | Pneumatic | Pneumatic |
| Upper support fixture | 4-pos' | 4-pos' | 4-pos' | — | — | 4-pos' |
| Mechanical tension (kg) | 1 | 1 | 1 | — | 1 | — |
| Cone shape (cm) | 2 | 1 | 2 | 14 | 12 | 6 |
| Roll diameter (mm) | 32 | 30 | 32 | 42 | 35 | 46 |

As shown in Table 1, the machine for folding the side curtain airbag of Examples 1 to 3 according to the present invention has an excellent characteristic in terms of the quality of a cushion folding product. In particular, in the machine for folding the side curtain airbag of Examples 1 to 3, a cone shape occurrence possibility after folding is very low and the rolling diameter does not exceed 36 mm.

On the contrary, when a cushion having a cushion length of 2.0 m or more is folded by the conventional machine, since the conventional machine is not fixed as described in Comparative Example 1, it is difficult to maintain a specific form and power transferring is not efficient, and as a result, the cone shape may occur or the roll diameter may increase. In addition, when sufficient tension is not applied to the upper support fixture fixing the cushion or the top, the folding failure problem may occur and folding workability may remarkably deteriorate.

The invention claimed is:

1. A machine for folding a side curtain airbag, comprising:
   a folding table;
   an L-shape folding plate fixing one end of an airbag cushion;
   a fixed rotatable roll folding bar with left and right manual handles;
   a mechanical tension module applying a load to one end of the airbag cushion;
   an upper support fixture fixing the position of the airbag cushion in roll folding; and
   a roll-folded cushion fixing lower support bar disposed on the bottom of the fixed rotatable roll folding bar,
   wherein the thickness of the fixed rotatable roll folding bar is 1.0 to 3.0 mm;
   wherein the upper support fixture includes an air-cylinder clamp module disposed on the top of the fixed rotatable roll folding bar along the entire airbag cushion length or disposed at three or more locations; and
   wherein the load applied by the mechanical tension module to the airbag cushion is 1 kg to 5 kg.

2. The machine of claim 1, wherein the mechanical tension module applies a load to the top of the airbag cushion.

3. The machine of claim 1, further comprising a tension unit capable of controlling horizontal edge tension of the airbag cushion.

4. The machine of claim 1, further comprising an air-cylinder or manual clamp module for supporting one end of the airbag cushion.

5. The machine of claim 1, further comprising a guide rail moving the L-shaped folding plate to the bottom.

6. The machine of claim 1, further comprising a handle support fixture supporting a rotating body of the fixed rotatable roll folding bar to not touch the folding table.

7. A process for folding a side curtain airbag using the machine of claim 1, the process comprising
   applying a load to one end of an airbag cushion after fixing the bottom of the airbag cushion to a fixed rotatable roll folding bar with left and right manual handles and performing roll folding by fixing the position of the airbag cushion by using an upper support fixture,
   wherein the load applied to the one end of the airbag cushion is 1 kg to 5 kg.

8. A machine for folding a side curtain airbag, comprising:
   a folding table;
   an L-shaped folding plate fixing one end of an airbag cushion;
   a guide rail moving the L-shaped folding plate to the bottom of the airbag cushion;
   an air-cylinder type or manual clamp module for supporting one end of the airbag cushion;
   a mechanical tension module applying a load to one end of the airbag cushion;
   a fixed rotatable roll folding bar with left and right manual handles;
   a handle support fixture supporting a rotating body of the fixed rotatable roll folding bar to not touch the folding table;
   a roll-folded cushion fixing lower support bar disposed on the bottom of the fixed rotatable roll folding bar; and
   an upper support fixture fixing the position of the airbag cushion in roll folding,
   wherein the thickness of the fixed rotatable roll folding bar is 1.0 to 3.0 mm;
   wherein the upper support fixture includes an air-cylinder clamp module disposed on the top of the roll folding bar along the entire airbag cushion length or disposed at three or more locations; and wherein the load applied by the mechanical tension module to the airbag cushion is 1 kg to 5 kg.

* * * * *